2,842,562
Patented July 8, 1958

2,842,562

CYCLIZATION OF AROMATIC CARBOXYLIC ACID COMPOUNDS

Albert Bloom, Summit, N. J., Richard K. Lehne, Buffalo, N. Y., and Melvin R. Stevinson, Union, N. J., assignors to General Aniline & Film Corporation, New York, N. Y., a corporation of Delaware No Drawing. Application October 30, 1953
Serial No. 389,476

8 Claims. (Cl. 260—369)

This invention relates to a process for ring-closing or cyclicizing organic compounds and more particularly ring-closing o-aroyl-aromatic carboxylic acid compounds and o-arylmethyl aromatic carboxylic acid compounds.

Ring-closure of o-aroyl aromatic carboxylic compounds in order to produce the corresponding ring-closed products, as for example, anthraquinone from o-benzoyl benzoic acid, is well known. However, in the prior art methods, the acidic condensing agent is usually sulfuric acid or oleum employed in relatively large proportions, thus functioning at the same time as a solvent or diluent for the reaction. In almost all such prior art methods at least about 90% of the condensing agent by weight of the compound being ring closed is employed. Such methods are subject to several disadvantages. Thus in view of the bulk of the reaction mixture, large pieces of equipment must be employed. For the isolation of the resultant cyclized compound, additional equipment is necessary since the reaction mixture must be drowned and the product filtered off. In many cases the product produced is precipitated in a form which is not readily separated by the usual filtration methods. Further, the large amount of sulfuric acid required is economically undesirable in addition to posing problems in corrosion, industrial hygiene, safety and disposal.

It is an object of this invention to provide a process which will correct the defects of the aforementioned prior art methods. Other objects and advantages will appear as the description appears.

The instant invention is directed to a method for ring-closing compounds of the type described above by heating such compounds in the presence of a catalytic amount of acidic dehydrating agent and, if desired, a diluent such as an inert organic solvent or flux. The operativeness of the instant process for producing the desired results is surprising since it has been generally believed that at least equal amounts of acidic condensing agent is required to give a high yield of the desired product.

In general, the process is carried out by heating the compound to be ring-closed at temperatures of about 100 to 300° C., preferably 200 to 260° C., in the presence of about 0.1 to 5%, preferably about 2%, of an acidic dehydrating agent by weight of the said compound. It will of course be understood that the temperature, duration, proportions of such compound and condensing agent and the like are interdependent. The reaction may be completed in from about 1 minute to two hours, in most cases within about one-quarter to one-half an hour. The reaction may usually be tested for completion by dropping a portion of the reaction mixture into alkali, filtering and acidifying the filtrate. The formation of a precipitate indicates the presence of alkali soluble starting material.

The acidic dehydrating agent may be any of those customarily employed for ring-closing suitable aromatic compounds such as ortho-benzoic acid derivatives. By way of example, there may be mentioned as such agents aromatic sulfonic acids such as toluene sulfonic acid, halogen sulfonic acids such as chlorsulfonic acid, metal halides such as the chlorides and bromides of aluminum, zinc, calcium, iron and the like, phosphoric acid and its anhydrides, phosphorous pentachloride, hydrofluoric acid, sulfuric acid, oleum and the like. Since the reaction is carried out at temperatures of at least 100° C., the water of condensation and any water initially present in the compound to be ring-closed and in the dehydrating agent is continuously removed from the reaction mixture, which is usually in the form of a hot melt or fused mass. It is preferred that the starting compound and dehydrating agent contain little or no water. For example, it is preferred to use as the acidic dehydrating agent sulfuric acid of at least 85% concentration including oleum of up to 65% strength. It will accordingly be understood that the term "sulfuric acid" as employed herein and in the appended claim is inclusive of oleum.

If desired, the reaction may be carried out in the presence of an inert organic solvent or flux such as the acyclic higher hydrocarbons and polyhalogenated aromatic hydrocarbons. Thus, there may be employed dodecane, trichlorobenzene, tetrachlorobenzene, tetrachloronaphthalene and the like. In general, solvents having a high boiling point are preferred, although lower boiling solvents may be employed and the reaction carried out under reflux or pressure. Only sufficient solvent or flux is needed to maintain the reaction mixture in fluid condition, or up to about 25% by weight of the compound being cyclized. It will be understood that too large an amount of solvent or flux is undesirable since it must be removed by distillation or the like.

The process is operative for cyclizing or ring-closing o-arylmethyl aromatic carboxylic acid compounds and o-aroyl aromatic carboxylic acid compounds, preferably the latter. It will be understood that the aromatic residues of such compounds may contain inert substituents which do not affect the progress of the desired reaction for obtaining the desired product. Such substituents may be for example, nitro, alkyl such as methyl and ethyl, halogen such as bromine and chlorine, and the like. Instead of the free carboxylic acid compounds, their functional equivalents may be employed such as their salts and esters. The corresponding ring-closed derivatives will be produced in each case. As representative of compounds which may be subjected to the process of the instant invention, there may be mentioned 2-benzoyl benzoic acid, 2-(4-chlorobenzoyl)benzoic acid, nitro benzoyl benzoic acids, 2-toluyl benzoic acid, and the like.

Several advantages and unexpected results are attributable to the instant invention. Thus the reaction product usually requires no further treatment for use as an intermediate in the manufacture of dyestuffs and the like, since drowning, washing and drying may be eliminated. A major savings is effected in the use of such small amounts of acid. Apparatus smaller in number and size may be employed for producing relatively large amounts of the ring-closed compounds. The process is readily adaptable to continuous production methods. In most instances yields are increased and reaction times reduced.

The following examples are given for illustrative purposes only and are not to be regarded as limitative.

Example I

Into a reaction flask there is charged 100 g. of benzoyl-2-benzoic acid, 10 g. of trichlorobenzene and 1.8 g. of 96% sulfuric acid. The mass is heated at 250 to 260° C. for one-half hour while allowing the water of reaction to escape. The resulting mixture containing the desired anthraquinone product may be used directly as an intermediate for the production of derivatives thereof.

Example II

The procedure of Example I is repeated, at the conclusion of which the reaction mixture is steam-distilled to remove any remaining trichlorobenzene and the anthraquinone filtered off, washed and dried. The yield is 96.9% of theory and the purity 96.9%.

Example III

Into suitable equipment there is charged 25 g. of benzoyl 2-benzoic acid and 0.5 g. of 96% sulfuric acid. The mixture is heated at 250 to 260° C. for one quarter hour. The yield of anthraquinone is 95.5% of theory and the purity 92.6%.

Various modifications and variations of this invention will be obvious to a person skilled in the art, and it is understood that such modifications and variations are to be included within the purview of this application and the spirit and scope of the appended claims.

We claim:

1. A process for producing an anthraquinone compound comprising cyclicizing an o-benzoylbenzoic acid compound devoid of reactive interfering substituents by heating such compound in the presence of from about 0.1 to 5% by weight thereof of an acidic dehydrating agent, having a concentration equivalent to at least 85% sulfuric acid, at a temperature of about 100 to 300° C.
2. The process of claim 1 in which the compound cyclicized is o-benzoyl benzoic acid.
3. The process of claim 2 in which the acidic dehydrating agent is sulfuric acid.
4. A process for producing an anthraquinone compound comprising cyclicizing an o-benzoylbenzoic acid compound devoid of reactive interfering substituents by heating such compound in the presence of an inert organic diluent and of from about 0.1 to 5% by weight of said compound of an acidic dehydrating agent, having a concentration equivalent to at least 85% sulfuric acid, at a temperature of about 100 to 300° C.
5. The process of claim 4 in which the compound cyclicized is o-benzoyl benzoic acid.
6. The process of claim 5 in which the acidic dehydrating agent is sulfuric acid.
7. The process of claim 1 in which the acidic dehydrating agent is sulfuric acid.
8. The process of claim 4 in which the acidic dehydrating agent is sulfuric acid.

References Cited in the file of this patent

UNITED STATES PATENTS

| | | |
|---|---|---|
| 1,895,788 | Daniels | Jan. 31, 1933 |
| 1,906,581 | Gubelmann et al. | May 2, 1933 |
| 1,919,563 | Kranzlein et al. | July 25, 1933 |

OTHER REFERENCES

Harding: Color Trade Journal, vol. 9, November 1921, pages 184–186.

Phillips: Zeitschrift fur Farbenindustrie, vol. 20, pages 123–4, March 1928.

UNITED STATES PATENT OFFICE

CERTIFICATE OF CORRECTION

Patent No. 2,842,562                           July 8, 1958

Albert Bloom et al.

It is hereby certified that error appears in the printed specification of the above numbered patent requiring correction and that the said Letters Patent should read as corrected below.

Column 1, line 70, for "ortho-benzoic" read -- ortho-benzoyl-benzoic --.

Signed and sealed this 14th day of June 1960.

(SEAL)
Attest:
KARL H. AXLINE                                  ROBERT C. WATSON

Attesting Officer                                Commissioner of Patents